Nov. 2, 1971                    R. B. TASSIE                    3,616,719
                            NOTCHING SHEET MATERIAL
Filed Sept. 25, 1969                                         2 Sheets-Sheet 1

Nov. 2, 1971   R. B. TASSIE   3,616,719

NOTCHING SHEET MATERIAL

Filed Sept. 25, 1969   2 Sheets-Sheet 2

3,616,719
NOTCHING SHEET MATERIAL
Robert B. Tassie, South Burlington, Vt., assignor to J. F. Kidder Manufacturing Company, Inc., South Burlington, Vt.
Filed Sept. 25, 1969, Ser. No. 860,989
Int. Cl. B26f 1/12
U.S. Cl. 83—620
13 Claims

ABSTRACT OF THE DISCLOSURE

Press for notching sheet material with upper and lower blade assemblies each having a pair of blades abutting at a plane and having respective cutting edges terminating at that plane, each pair including a blade adjustable along a path parallel to the abutment plane.

---

This invention relates to cutting notches in sheet material.

A primary object of the invention is to simplify blade adjustment in a notching press, incident to preparing the press to produce a notch of desired shape (e.g., in converting the press from plain notching to tab notching). Other objects are to provide for accurate, rapid blade adjustment (e.g., with a minimum of motions, and without required removal and replacement of parts), through a wide variety of positions, with reliable, inexpensive apparatus that can be adjusted for making cuts of any angle.

The invention features upper and lower blade assemblies each having a pair of blades abutting at a plane and having respective cutting edges terminating at that plane, each pair including a blade adjustable along a path parallel to the abutment plane. In preferred embodiments only one blade of each pair is adjustable, the adjustable blades being a shearing pair in operation of the press; each adjustable blade is mounted on a blade holder in turn secured to a platen by one or more screws located in slots elongated in a direction parallel to the abutment plane; one blade holder has a mounting portion that extends outwardly of the press from its carried blade, the other holder has a mounting portion that extends inwardly of the press from its carried blade, and both holders are screwed to their platens at locations accessible when upper and lower blades are respectively engaged with each other, so that the adjustable blades can be positioned simultaneously and while in engagement; one blade holder has a pair of elongated openings and is slidable between a pair of retaining walls each having openings for screws, that holder in addition being slidable between a pair of additional walls parallel to the abutment plane and spaced from the holder; and the other holder has a threaded opening for receiving a screw located in an elongated opening in the respective platen, the platen providing a guide tongue to ride in a groove in the holder parallel to the abutment plane, the elongated opening being adjacent the tongue.

Other objects, features, and advantages will appear from the following description of a preferred embodiment taken together with the attached drawings in which.

Press 10 has upper platen 12 mounted in conventional fashion for vertical reciprocation with respect to frame 14 under control of pivoted manual operating arm 16, and fixed lower platen 18.

Figure 3:
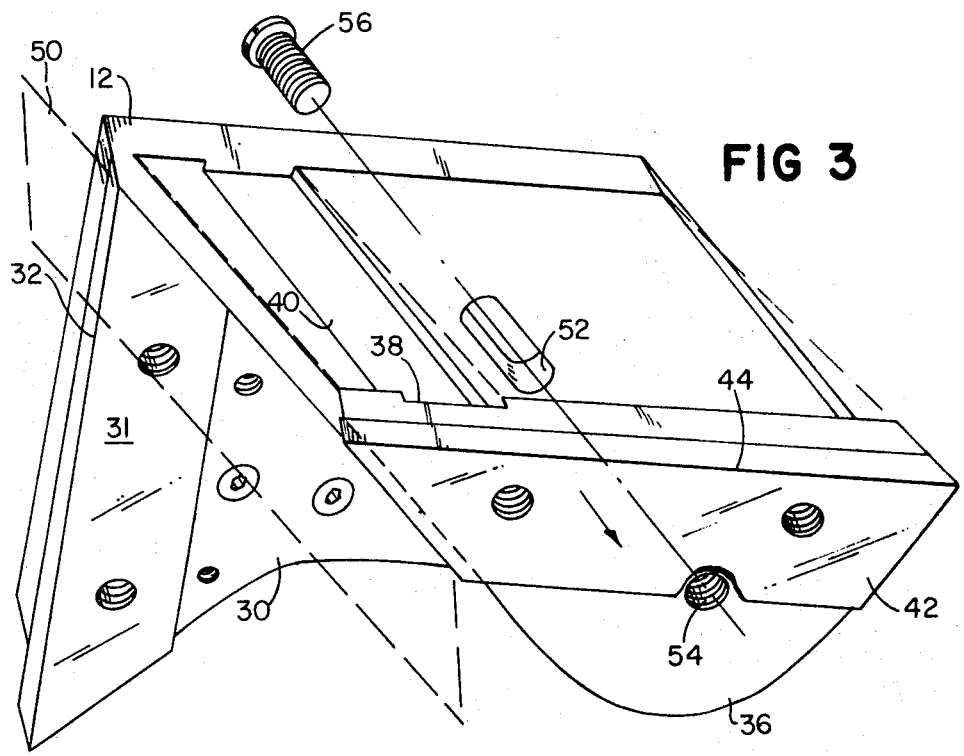
FIG. 3 is an isometric view, partially broken away and exploded, of the upper platen.

Upper platen 12 (see especially FIG. 3) has fixed thereto a blade holder 30 carrying a fixed blade 31 having a cutting edge 32. Movable blade holder 36 has a groove 38 that mates with guide tongue 40 of platen 12, and carries blade 42 having cutting edge 44. Both blades are mitered at 45°, and the blades and holders abut along an imaginary plane 50. Platen 12 has adjacent tongue 40 an opening 52 elongated in the direction parallel to plane 50. Holder 36 has a threaded hole 54 aligned with opening 52. Screw 56 passes freely through hole 52 and is threaded in hole 54 to tightly secure holder 36 to platen 12.

Figure 2:
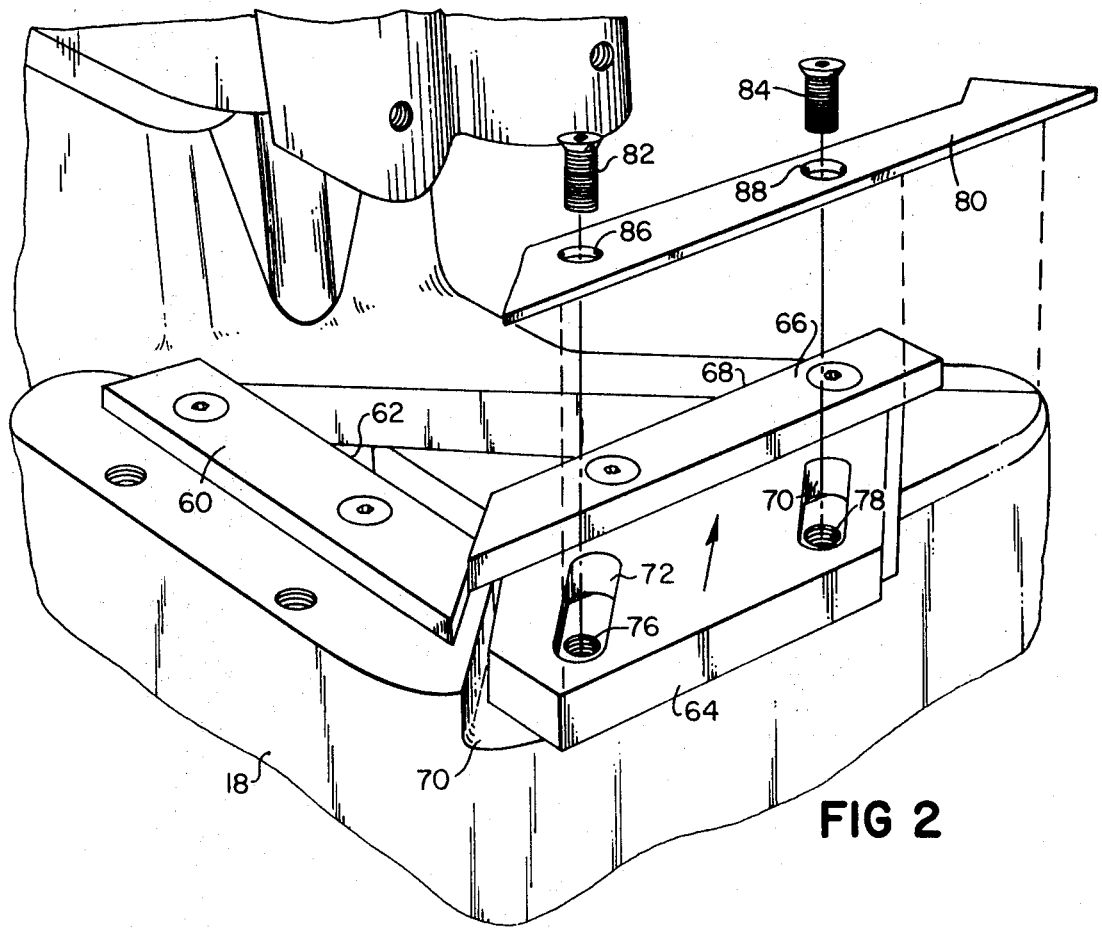
FIG. 2 is an isometric view, partially exploded, of the press with the upper platen removed.

Lower platen 18 (see especially FIG. 2) has fixed thereto a blade 60 having a cutting edge 62 aligned to shear with edge 32 of blade 31. Movable blade holder 64, carrying blade 66 with cutting edge 68, is located in platen recess 70. Blades 60 and 66 are mitered at 45° and abut along plane 50. Holder 64 has two openings 72 and 74 elongated in a direction parallel to plane 50 and respectively aligned with threaded holes 76 and 78 in platen 18. Stripping 80 is secured to platen 18 adjacent blades 60 and 66, and covers holder 64. Screws 82 and 84 pass through holes 86 and 88 in stripping 80, and then through opening 72 and hole 76, and opening 74 and hole 78, respectively, to tightly secure holder 64 to platen 18. The floor of recess 70 and the underside of stripping 80 provide retaining walls between which holder 64 slides, the holder being slightly spaced from the side walls of the recess which are parallel to plane 50.

Figure 1:
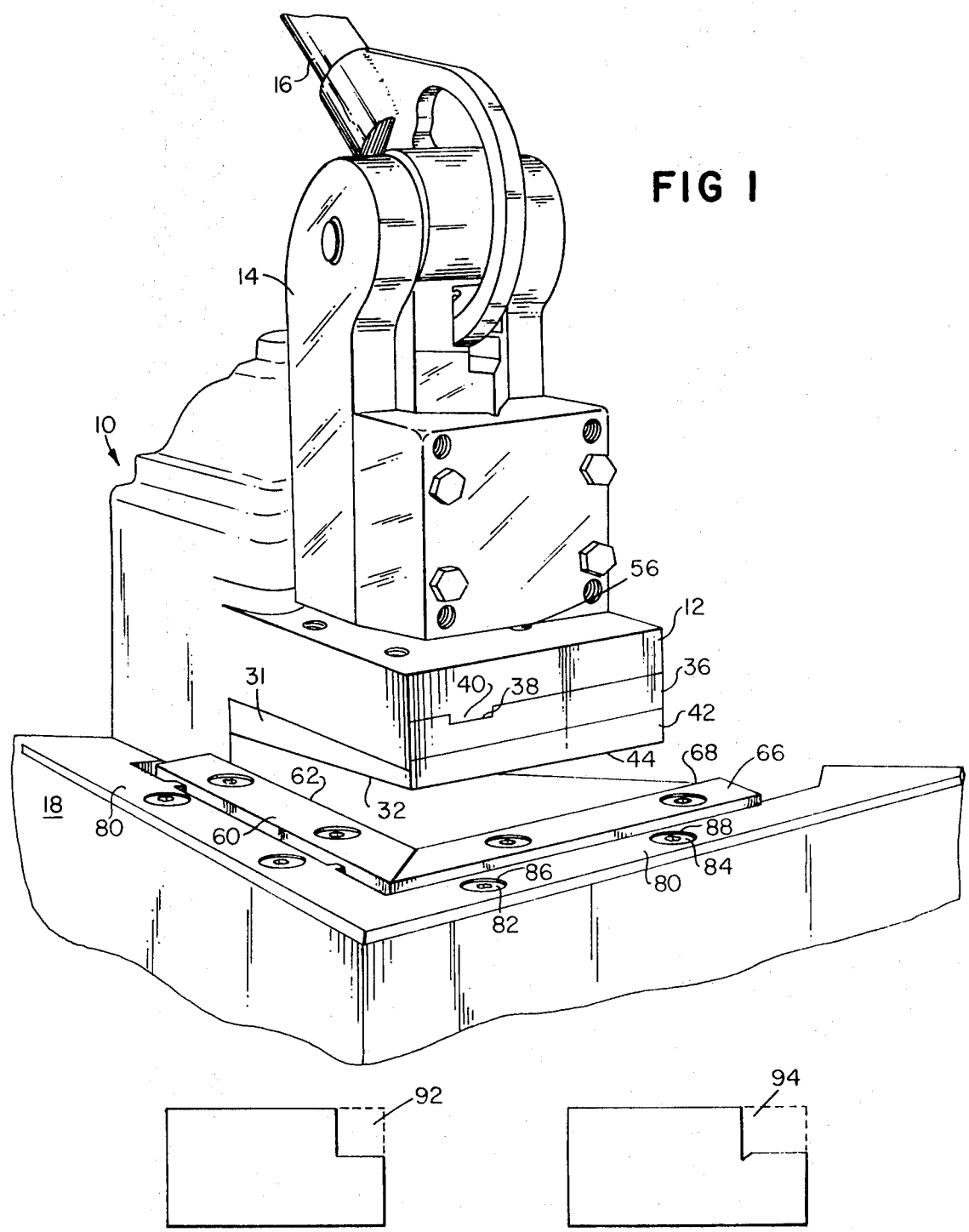
FIG. 1 is an isometric view of a press.
Figure 4:
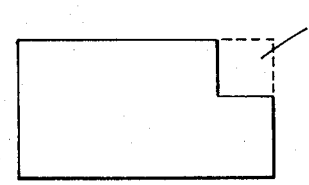
FIG. 4 is a plan view of a plain notched sheet of metal.
Figure 5:
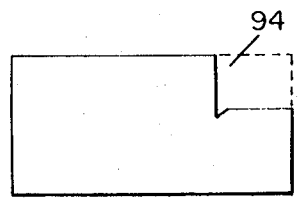
FIG. 5 is a plan view of a tab notched piece of metal.

In operation, with blades 44 and 66 arranged so that edges 32 and 44, and edges 62 and 68, intersect in plane 50 (as shown in FIG. 1) press 10 will make a plain 90° notch 92 in a piece of sheet metal as shown in FIG. 4. To adjust the press for making a tab notch 94 as shown in FIG. 5, platen 12 is lowered so that the respective upper and lower cutting edges shear past each other, and screws 56, 82 and 84 are loosened. Blade 66 is moved inwardly of the press (see arrows in FIG. 2) the desired distance. In turn, blade 66 movees blade 42 inwardly and equal distance (see arrow in FIG. 3), so that edges 68 and 44 remain in shearing alignment. Screws 56, 82, and 84 are then tightened.

By moving blade 42 inwardly of the press, out of shearing alignment with blade 66, the press can be adapted to make individual cuts at any angle.

Other embodiments will occur to those skilled in the art and are within the following claims.

What is claimed is:

1. In a press for notching sheet material, upper and lower blade assemblies each having a pair of blades abutting at a plane, said blades having respective cutting edges terminating at said plane, each said pair including a blade adjustable along a path parallel to said plane.

2. The apparatus of claim 1 wherein said adjustable blades include a shearing pair thereof in operation of said press.

3. The apparatus of claim 2 wherein only two of said blades are adjustable.

4. The apparatus of claim 1 comprising an adjustable blade fixed to a holder in turn mounted on a platen and held in place by one or more screws each located in a slot elongated in a direction parallel to said plane.

5. The apparatus of claim 4 wherein two adjustable blades are fixed to holders each in turn mounted on a respective platen and held in place by one or more screws each located in a slot elongated in a direction parallel to said plane.

6. The apparatus of claim 1 wherein one said adjustable blade is carried by a holder which has a mounting portion that extends outwardly of the press from its respective carried blade, said holder being secured to a platen at said mounting portion, whereby said mounting portion is accessible when said assemblies are in shearing engagement.

7. The apparatus of claim 6 wherein said holder is included in said lower blade assembly.

8. The apparatus of claim 6 wherein a second adjustable blade is carried by a holder which has a mounting portion that extends inwardly of the press from its respective carried blade, said holders being respectively included in said lower and upper blade assemblies.

9. The apparatus of claim 8 wherein said second holder is included in said upper blade assembly.

10. The apparatus of claim 1 wherein a said adjustable blade is carried by a blade holder mounted on a platen, and said platen provides a pair of retaining walls and a pair of additional walls, said retaining walls being adjacent to and confining said holder, said additional walls being parallel to said plane.

11. The apparatus of claim 10 wherein a second said adjustable blade is carried by a second holder mounted on a second platen, said second platen providing a guide tongue parallel to said plane and engaged with a groove in said holder.

12. The apparatus of claim 10 wherein said retaining walls each have at least one opening for a holder-securing screw located in an opening in said holder, said opening in said holder being elongated in a direction parallel to said plane.

13. The apparatus of claim 1 wherein said blades are mitered at 45°.

References Cited

UNITED STATES PATENTS

| | | | |
|---|---|---|---|
| 1,351,115 | 8/1920 | Morse | 83—693 X |
| 2,837,160 | 6/1958 | Vera et al. | 83—917 X |
| 3,205,748 | 9/1965 | Smeets | 83—700 X |
| 3,215,017 | 11/1965 | Rutz | 83—917 X |
| 3,277,763 | 10/1966 | Haug | 83—917 X |

WILLIAM S. LAWSON, Primary Examiner

U.S. Cl. X.R.

83—693, 700, 917